UNITED STATES PATENT OFFICE.

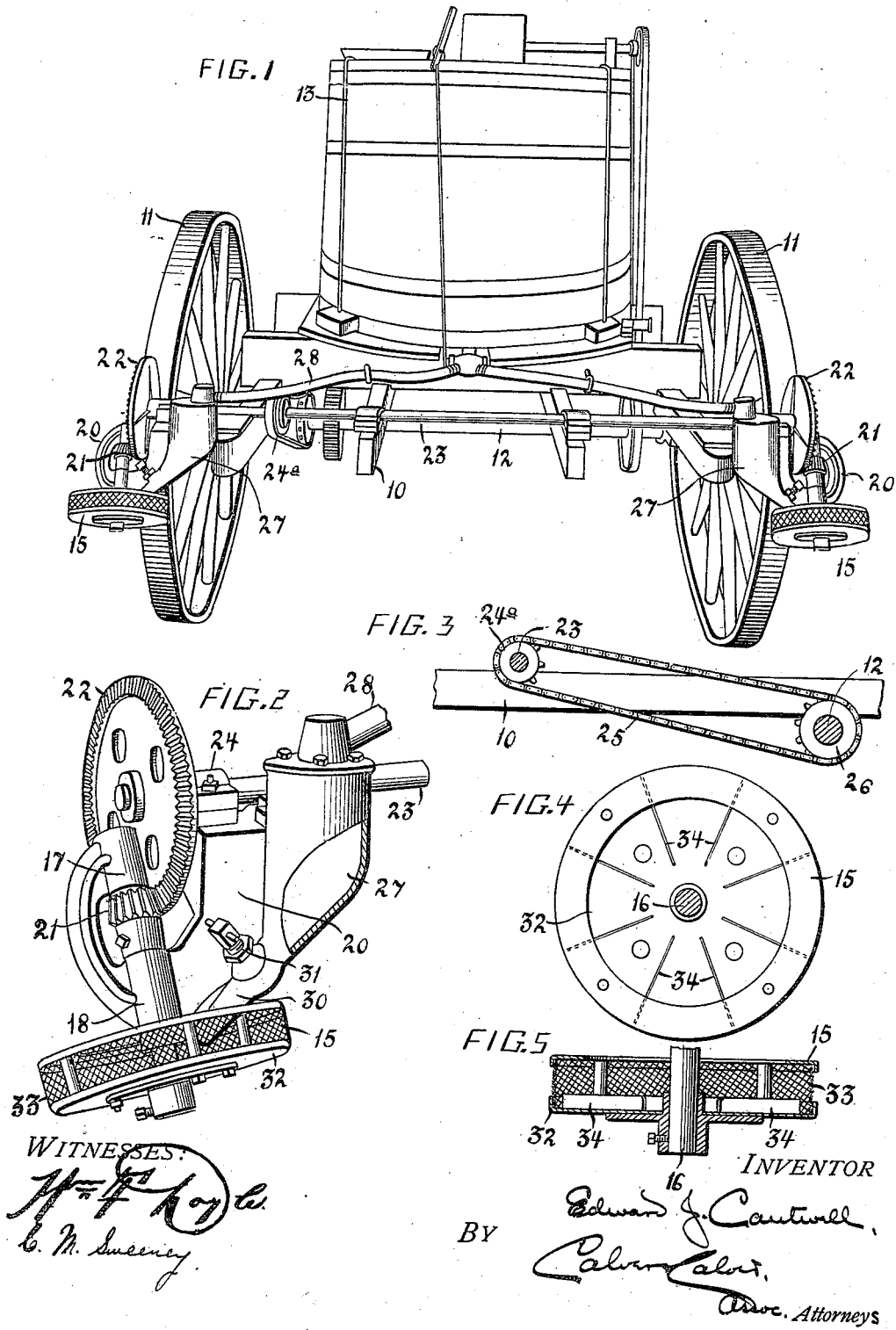

EDWARD J. CANTWELL, OF UTICA, NEW YORK, ASSIGNOR TO CHARLES H. CHILDS & COMPANY, OF UTICA, NEW YORK.

SPRAYING-MACHINE.

990,335.

Specification of Letters Patent.    Patented Apr. 25, 1911.

Application filed March 15, 1909. Serial No. 483,409.

*To all whom it may concern:*

Be it known that I, EDWARD J. CANTWELL, of Utica, in the county of Oneida and State of New York, have invented certain new and useful Improvements in Spraying-Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

The objects of the invention, together with means whereby the same may be carried into effect, will best be understood from the following description of one form or embodiment thereof illustrated in the accompanying drawings in which:—

Figure 1 shows a perspective view from the rear of a spraying machine embodying my improvements. Fig. 2 is an enlarged detailed perspective view of a portion of the mechanism, being that portion more particularly appertaining to my improvements. Fig. 3 is a detail view of a portion of the spray pan driving mechanism. Fig. 4 is a top or plan view on an enlarged scale of a spray pan employed in the machine. Fig. 5 is a vertical sectional view of the same in connection with a short section of the shaft on which it is mounted.

In the drawings, the frame 10 of the vehicle is mounted upon a pair of carrying and driving wheels 11, 11, which are coupled to and adapted to drive the axle shaft 12. On a suitable part of said vehicle is mounted a spray solution tank 13, which tank will preferably be provided with an agitator. On the rear corners of the frame are mounted the spray pans 15, 15, preferably in an inclined plane. Each pan 15 is secured to the lower end of a short shaft 16, which extends in a substantially upright direction and runs in spaced bearings 17 and 18 provided in a casting 20, which is secured on the rear corner of the frame. Between the bearings 17 and 18 there is secured on the shaft 16 a small toothed beveled gear pinion 21, which meshes with the large beveled gear wheel or pinion 22 secured on the countershaft 23. The shaft 23 extends across the rear end of the frame from side to side and runs in bearings 24 provided close to the wheels 22 and which are integral with or directly mounted on the castings 20. The shaft 23 is provided with a sprocket wheel 24ª and is driven by a chain 25 from a sprocket wheel 26 and gearing on the axle shaft 12 at substantially the same, or very slightly greater, speed as said axle shaft. The casting 20 also includes a small solution reservoir 27, which is connected with the solution tank 13 by a tube 28. The reservoir 27 is provided with an outlet or nozzle 30 which is restricted or of a less cross-sectional area than that of the reservoir, said nozzle projecting into the pan near its center and being provided with a regulating cock 31. The pan consists of a base disk 32 around the periphery of which is secured an upwardly projecting foraminous wall 33. On the inner side of the disk 32 are located a series of radial plates 34.

The gearing between the axle shaft 12 and the spray pans 15 is such that the pans are rotated very rapidly as the machine is drawn forward. It is evident that when the solution is allowed to flow through the pipes 28 and into the reservoirs 27 the regulating valves 31 being open the same will be discharged into the spray pans adjacent to the center. The rapid revolution of these pans will throw the solution out radially and substantially in all directions. In case one side of the frame should be temporarily unduly elevated, the receptacle 27 will contain a sufficient quantity of solution to supply its individual pan for a limited period, thereby permitting the tank 13 to be located in a relatively low position on the frame, so that the pipes 28 are normally substantially horizontal, and at the same time insuring a continuous delivery of liquid in passing over rough or uneven roads. It will be observed that in the construction shown the nozzles 30 communicate with the bottom of the reservoirs 27 throughout the entire area or with both sides of said bottoms, particularly at the sides of said reservoirs toward the center of the vehicle or away from the spray pan, so that if either of these reservoirs is tilted in this direction, as would be the case if the corresponding side of the vehicle were elevated, the liquid will still flow therefrom into the spray pan.

It may be noted that machines of this class are subjected to very hard usage with little or no care to the mechanism being given, and it is difficult to secure high speeds without unnecessary binding and friction as the vehicle is drawn over uneven surfaces. The arrangement of mechanism herein shown will permit a large amount of wearing and warping or other distortion of the frame of the machine without materially interfering with the rotation of the spray pans or increasing the friction in driving them. The high speed of the pan is secured immediately at the pan, while the portions of the driving mechanism more remotely from the pan are driven at comparatively low speed, and hence close fitting of bearings and accurate adjustments are required only in the shaft carrying the spray pan. The shaft carrying the spray pan in the mechanism herein shown and described is so held that the pan is held securely from wabbling even when the bearings become somewhat worn and power is applied to this shaft without any tendency to cause the pan to wabble.

What I claim as new and desire to secure by Letters Patent is:

The combination in a spraying machine of a vehicle frame, a tank carried by said frame, a spraying device arranged at each side of said frame, a separate reservoir adjacent each of said spraying devices, pipes connecting said tank with said reservoirs respectively, and downwardly projecting nozzles leading from the respective reservoirs, each of said nozzles communicating with substantially the entire bottom of the corresponding reservoir and having a restricted outlet adapted to deliver liquid to the corresponding spraying device, substantially as set forth.

In witness whereof, I have affixed my signature, in presence of two witnesses, this 9th day of March, 1909.

EDWARD J. CANTWELL.

Witnesses:
EMMA S. HESSE,
T. L. WILDER.

---

Copies of this patent may be obtained for five cents each, by addressing the "Commissioner of Patents, Washington, D. C."